United States Patent [19]
Asprey

[11] Patent Number: 5,227,666
[45] Date of Patent: Jul. 13, 1993

[54] POWER SHARING SWITCHING CIRCUIT

[75] Inventor: Robert R. Asprey, Harvest, Ala.

[73] Assignee: Cybex Corporation, Huntsville, Ala.

[21] Appl. No.: 627,983

[22] Filed: Dec. 17, 1990

[51] Int. Cl.$^5$ .............................................. H02J 1/10
[52] U.S. Cl. ........................................ 307/44; 307/48; 307/65
[58] Field of Search .................... 307/43, 44, 47, 48, 307/52, 53, 64–68, 75, 76, 80, 81, 87, 113, 115, 130, 355, 356, 358, 494

[56] References Cited

U.S. PATENT DOCUMENTS

| | | | |
|---|---|---|---|
| 4,017,779 | 4/1977 | McDonald et al. | 320/15 |
| 4,492,876 | 1/1985 | Colbert et al. | 307/66 |
| 4,617,473 | 10/1986 | Bingham | 307/66 |
| 4,774,450 | 9/1988 | Kitamura | 323/285 |

Primary Examiner—A. D. Pellinen
Assistant Examiner—David Osborn
Attorney, Agent, or Firm—Phillips & Beumer

[57] ABSTRACT

A switching circuitry for coupling the power output of one of a plurality of power supplies to a keyboard. In this disclosure, a switching transistor of the circuit is coupled to switch power from a power supply output to a common point to which a plurality of like circuits and a keyboard are coupled. A differential amplifier having one input coupled to the common point and another input coupled to the power output of the respective power supply compares voltage on the common point to the voltage of the power supply. If the power supply voltage is higher than the voltage on the common point, the amplifier provides an enabling signal to the transistor, coupling power from the power supply to the common point. Conversely, if the voltage on the common point is higher than the voltage of the power supply output, the amplifier provides a disabling signal to the transistor, decoupling the power supply output from the common point. Diodes shunt the switching transistors in order to provide power to the differential amplifiers.

2 Claims, 1 Drawing Sheet

POWER SHARING SWITCHING CIRCUIT

FIELD OF THE INVENTION

This invention relates generally to electrical power supply switching circuitry and particularly to direct current (D.C.) power supply switching and selection wherein power from one of a plurality of discrete power sources is selected for use in accordance with a highest output voltage level of the power supplies.

BACKGROUND OF THE INVENTION

There exist devices on the market today for interfacing a plurality of PC-type computers each having its own power supply to a single keyboard and monitor. One well-known device of this type is the COMMANDER, manufactured by Cybex Corporation of Huntsville, Ala. In this device, up to 96 microcomputers may be connected to the COMMANDER module and accessed by the keyboard and monitor. Coupled to the COMMANDER module is a single keyboard and monitor, with the keyboard and monitor being selectively coupled via the module to any one of the computers connected to the module. Thus, the COMMANDER module, in addition to other functions, interfaces the single keyboard and monitor to one of several computers, any one of which may be powered "on" or "off" at any point in time.

Uses of these devices occur generally where it is desired to infrequently access one of a number of computers via a keyboard and monitor, each performing a separate function and being grouped together at a single location, such as in a control room of a large building wherein separate computers control heating systems, elevators, lighting, etc. Another use occurs in the networking of computers wherein separate computers function as file servers that provide information to remote users. In these situations, the computers may be automatically powered up or down as needed and may be infrequently accessed at their location for maintenance or to obtain statistical data therefrom. In this situation, it is highly desirable to provide a single keyboard and monitor selectively couplable to each of the computers as needed.

Problems arise with these interface devices with respect to the supplying of power to the keyboard. Ideally, as any one of the computer power supplies is capable of powering the keyboard, the logical approach would be to simply couple the power supplies of the computers together in parallel so that at least one of the computers provides power to the keyboard. However, the slight differences and transient surges in voltage levels between the power supplies of the computers cause a condition known as "power supply contention," which can drive voltage regulators of the power supplies into uncontrolled oscillations, disabling or possibly "smoking" the contending power supplies. Additionally, if one of the computers is switched "off," the computer power supplies that are "on" will try to maintain power in the "off" computer.

To overcome power supply contention, one approach that has been utilized is to provide a separate power supply in the interface module for supplying power to the keyboard. However, this leads to increased cost and complexity of the interface module and does not advantageously utilize the computers, which are each designed to provide power to a keyboard.

Another approach to overcome the aforestated problem is to provide a diode or other semiconductor device in the output of each power supply, the power supplies connected in a parallel hook-up as described in order to effectively isolate the respective power supplies. However, with keyboards requiring relatively low potentials, such as +5 volts, the 700-millivolt diode drop across a silicon semiconductor junction pulls the +5-volt level supplied by the power supply down to approximately 4.3 volts which, in some cases, is not high enough to supply the keyboard. In some instances, the power supplies of the respective computers may be "tweaked" to offset the diode drop, but this is not desirable. Additionally, germanium devices, which only have a 200-millivolt voltage drop, may be used for isolation purposes, but these devices are expensive and have well-known temperature limitations that make them less suitable than silicon devices for this application.

Accordingly, it is an object of this invention to provide a circuit that may be used to isolate discrete power supplies coupled together and provide power from one of the power supplies to a common lead without introducing an unacceptable voltage drop in the supply voltage.

SUMMARY OF THE INVENTION

This disclosure relates to circuitry for switching a plurality of power supply outputs wherein a switching device of the circuitry is coupled between each power supply output and a common point to which a like plurality of circuits are coupled, the switching device having a control input coupled to an output of a comparison device that provides an enabling or disabling signal to drive the switching device into a conducting or non-conductive state, respectively, responsive to whether the power supply output of any of the power supplies is above or below a voltage level of said common point.

BRIEF DESCRIPTION OF THE DRAWING

The single drawing is a schematic view of a system inclusive of the present invention.

DESCRIPTION OF THE PREFERRED EMBODIMENT

Figure 1:
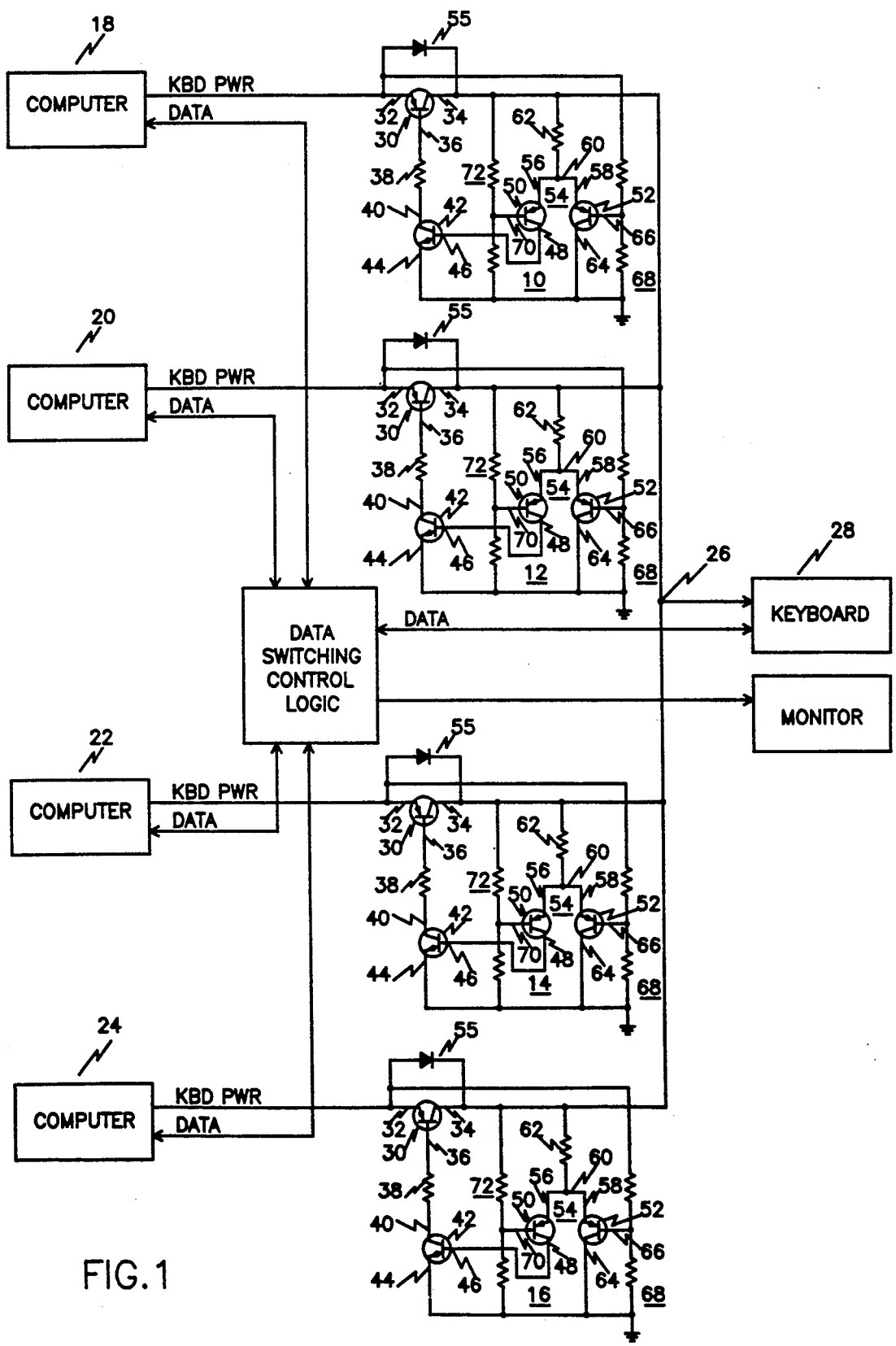

Referring to the drawing, circuits 10, 12, 14, and 16 are shown that may be used to couple D.C. (direct current) keyboard power from computers 18, 20, 22, and 24 to a common output point 26, from which a keyboard 28 derives its power. As shown, circuits 10, 12, 14, and 16 each includes a PNP transistor 30 having an emitter 32 coupled to a keyboard D.C. power output of the respective computer and a collector 34 coupled to common point 26, which is in turn coupled to keyboard 28. Transistors 30 function as switching transistors to selectively provide keyboard power to common point 26. Transistors 30 are biased "on" or "off" by a switching potential applied to bases 36, which are connected via current limiting resistors 38 to collectors 40 of transistors 42, which each have emitters 44 coupled to ground. Coupled as such, when transistor 42 is saturated by a positive potential on base 46, current from base 36 of transistor 30 is drained to ground via transistor 42 and limited by resistor 38. This saturates and switches "on" transistor 30, thus coupling keyboard power from the computer to point 26, less approximately 200 millivolts from the voltage drop across saturated transistor 30. Bases 46 of transistors 42 are each coupled to collectors 48 of transistors 50 which, in conjunction with transistors 52, forms differential amplifier circuits 54. Diodes 55 are coupled between emitters 32 and collectors 34 of transistors 30 and ensure minimum power to transistors 52 of amplifier circuits 54 with associated 700 millivolt voltage drop.

Differential amplifier circuits 54 function as comparators for comparing a voltage level of the output of the respective keyboard power supply with a voltage at common point 26. Amplifier 54 consists, as stated, of transistors 50 and 52, with emitters 56 and 58, respectively, of these transistors coupled to a common point 60. Point 60 in turn is coupled via a current limiting resistor 62 to common point 26 from which power is applied to keyboard 28. Collectors 64 of transistors 52 are connected to ground, and bases 66 are connected to a midpoint of voltage divider networks 68. Networks 68 divide, or reduce, voltage levels of the keyboard power outputs from computers 18, 20, 22, and 24 to about 2.5 volts. In contrast, bases 70 of transistors 50 are connected to a mid point of voltage divider network 72, which divides voltage from the common point 26 to approximately 2.5 volts and applies this voltage to bases 70 of transistors 50. Coupled as described, transistors 50 and 52 are biased in their operating regions, with equal currents flowing through transistors 50 and 52 with equal potentials applied from common point 26 and the keyboard power output from computer 22 as long as the base voltages are exactly equal.

When the voltage at point 26 rises above the keyboard power output of any of circuits 10, 12, 14, or 16, by more than a few millivolts, the respective voltage divider networks 72 increase base voltage of transistors 50, biasing transistors 50 "off," and biasing transistors 52 "on". This depletes base 46 of transistors 42 of potential, switching the particular transistor 42 "off" and blocking the current drain to ground from base 36 of transistor 30, switching transistor 30 "off" and decoupling the respective computer keyboard power supply from common point 26. Conversely, when a power output from any of computers 18, 20, 22, or 24 rises above the voltage level at point 26 by a few millivolts, voltage divider networks 68 increase the potential applied to bases 66 of the respective transistors 52, biasing transistors 52 "off" and providing transistors 50 with more working current. This in turn provides base 46 of transistor 42 with a saturating potential, switching it "on" and, in turn, saturating the respective transistor 30, switching it "on" and coupling power from the respective computer to common point 26. Thus, a threshold is provided by transistors 50 and 52 such that when the voltage of one of the power outputs of computers 18, 20, 22, or 24 rises above the voltage on point 26, the higher voltage on the power output is coupled to point 26. Conversely, when the voltage on any of the power supply outputs falls below a voltage level on point 26, the lower-voltage output is disconnected from point 26.

Initially, one may assume that the voltage drop across transistor 30 would be 700 millivolts, thus leading to the problem discussed above relating to the reduced voltage across an isolation device not being sufficient to drive the keyboard. However, this is not the case. In this application, transistor 30, a 2N2709 or equivalent, when fully saturated, has a collector-to-emitter voltage drop of only 200 millivolts. This drop only reduces the keyboard power supply voltage to 4.8 volts, a voltage level sufficient to drive virtually all keyboards utilizing this potential. Further, heat, on the order of 100 milliwatts, produced by this drop is also reduced because of the lower voltage drop of 200 millivolts as opposed to 700 millivolts for a diode.

Accordingly, and from the foregoing, it is apparent that the applicant has provided circuitry for applying power from a particular power supply to a power-providing point to which a plurality of power supplies are connectable responsive to a higher voltage level of a particular power supply than a voltage level on said power-providing point.

I claim:

1. A power selection system comprising:
   (A) at least one D.C. power source (18) having an output terminal (32);
   (B) a common terminal (26);
   (C) at least one first switching means (30) coupled between said output terminal (32) and said common terminal (26) and responsive to a first signal for connecting between said output terminal and said common terminal and responsive to a second signal for effecting a disconnection between said output terminal and said common terminal;
   (D) second switching means (72, 50, 42) responsive to the electrical state of said output terminal and a signal source for providing said first signal to said first switching means;
   (E) said signal source (68, 52, 62) comprising third switching means (68, 52) responsive to the signal state of said common point (26) for providing a power level from said source to said second switching means, the power level provided to said second switching means decreasing as the voltage at said common terminal increases, whereby said first switching means (30) effects said connection between said output terminal and said common terminal; and
   (F) unidirectional flow means (55) connected across said first switching means (30) and poled to conduct current flow in the same direction as said first switching means but having a voltage drop significantly greater than said first switching means, said unidirectional current flow means providing biasing power to said second and third switching means prior to conductive operation of said first switching means and in the absence of any initial potential on said common point.

2. A system as set forth in claim 1 wherein said second and third switching means are responsive to discrete and separated switching level signals from said power supply output terminal and said common terminal.

* * * * *